(12) United States Patent
Fujita

(10) Patent No.: US 8,083,297 B2
(45) Date of Patent: Dec. 27, 2011

(54) CORELESS RUBBER CRAWLER TRAVELING DEVICE

(75) Inventor: Yasuaki Fujita, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 157 days.

(21) Appl. No.: 10/588,089

(22) PCT Filed: Jan. 28, 2005

(86) PCT No.: PCT/JP2005/001183
§ 371 (c)(1),
(2), (4) Date: May 25, 2007

(87) PCT Pub. No.: WO2005/073060
PCT Pub. Date: Aug. 11, 2005

(65) Prior Publication Data
US 2007/0252433 A1    Nov. 1, 2007

(30) Foreign Application Priority Data
Jan. 29, 2004   (JP) .................. 2004-020815

(51) Int. Cl.
*B62D 55/14* (2006.01)
*B62D 55/24* (2006.01)
(52) U.S. Cl. ...................... 305/170; 305/165
(58) Field of Classification Search .......... 305/111, 305/112, 113, 115, 157, 158, 165, 167, 169–179, 305/184, 193, 194, 137; D15/28
See application file for complete search history.

(56) References Cited

U.S. PATENT DOCUMENTS 1,627,287 A * 5/1927 Kegresse ............... 305/184
2,494,065 A * 1/1950 Slemmons .............. 305/179
(Continued)

FOREIGN PATENT DOCUMENTS
EP    1 013 542 A1    6/2000
(Continued)

OTHER PUBLICATIONS

European Search Report dated Feb. 11, 2008.

(Continued)

*Primary Examiner* — Kip T Kotter
(74) *Attorney, Agent, or Firm* — Sughrue Mion, PLLC

(57) ABSTRACT

The present invention relates to a coreless rubber crawler traveling device in which spring characteristics are achieved by reducing a contact area of a wheel-rolling contact surface on an inner peripheral surface of a rubber elastic body with an outer surface of a tracker roller.

A coreless rubber crawler comprises an endless rubber elastic body, main cord rows embedded in the rubber elastic body in a longitudinal direction of the rubber elastic body, rubber projections formed on the inner peripheral surface of the rubber elastic body at uniform pitches, and rubber lugs formed on the outer peripheral surface of the rubber elastic body. In the coreless rubber crawler traveling device, a tracker roller, which is provided at the side of a vehicle body and which straddles the right and left sides of each of the rubber projections in the widthwise direction, rolls in such a manner that an outer surface of the tracker roller comes into contact with the inner peripheral surface of the rubber elastic body. A contact area of the inner periphery rolling contact surface of the rubber elastic body with the outer surface of the tracker roller is set in the range of 30% to 70% with respect to the area of the outer surface of the tracker roller.

7 Claims, 4 Drawing Sheets

U.S. PATENT DOCUMENTS

| | | | | |
|---|---|---|---|---|
| 5,022,718 A | * | 6/1991 | Diekevers | 305/136 |
| 5,131,728 A | * | 7/1992 | Katoh et al. | 305/174 |
| 6,106,083 A | * | 8/2000 | Ono | 305/171 |
| 6,176,557 B1 | * | 1/2001 | Ono | 305/177 |
| 6,471,307 B2 | * | 10/2002 | Watanabe et al. | 305/193 |
| 6,890,042 B2 | * | 5/2005 | Inaoka et al. | 305/173 |
| 6,942,305 B2 | * | 9/2005 | Ueno | 305/167 |
| 7,077,485 B2 | * | 7/2006 | Akiyama et al. | 305/178 |
| 7,083,242 B2 | * | 8/2006 | Piou et al. | 305/167 |
| 7,185,958 B2 | * | 3/2007 | Ueno | 305/167 |
| 7,367,637 B2 | * | 5/2008 | Gleasman | 305/165 |
| 2002/0047306 A1 | | 4/2002 | Watanabe et al. | |
| 2003/0160508 A1 | | 8/2003 | Ueno | |

FOREIGN PATENT DOCUMENTS

| | | | |
|---|---|---|---|
| EP | 1 273 504 A1 | | 1/2003 |
| JP | 56086871 A | * | 7/1981 |
| JP | 03-19785 | * | 2/1991 |
| JP | 2001-146182 A | | 5/2001 |
| JP | 2002-2564 A | | 1/2002 |
| JP | 2002-127955 A | | 5/2002 |
| JP | 2003-252259 A | | 9/2003 |
| WO | 03/097434 A1 | | 11/2003 |

OTHER PUBLICATIONS

Microfilm of the specification and drawings annexed to the request of Japanese Utility Model Application No. 143836/1983 (Laid-Open No. 50087/1985) (Kabushiki Kaisha Kubota Tekkosho), 3 pages (Apr. 8, 1985).

Microfilm of the specification and drawings annexed to the request of Japanese Utility Model Application No. 80103/1989 (Laid-Open No. 19785/1991) (Mitsubishi Agricultural Machinery Co., Ltd.), (Feb. 26, 1991).

* cited by examiner

CORELESS RUBBER CRAWLER TRAVELING DEVICE

TECHNICAL FIELD

The present invention relates to a coreless rubber crawler traveling device, and more particularly to a coreless rubber crawler traveling device with improved riding comfort.

BACKGROUND OF THE ART

A coreless rubber crawler traveling device is mainly applied to a vehicle running at a high speed. The above-described device is characterized in that no core metal is embedded in a rubber portion and generated vibration or the like is relatively small. However, there has also been demanded for enhancement of the riding comfort even in the rubber crawler as described above.

FIG. 7 is a cross sectional view showing the relationship between a coreless rubber crawler 30 which has been heretofore used extensively, and a tracker roller 40. In a rubber elastic body 31 having no core metal embedded therein, normally, an inner peripheral surface 32 is made flat, and main cord rows 33 are embedded substantially in the entire region of the rubber elastic body along the longitudinal direction of the rubber crawler. Rubber projections 34 each projecting inward from the inner peripheral surface 32 are disposed at uniform pitches. Further, rubber lugs 35 are formed on an outer peripheral surface of the rubber elastic body 31.

Meanwhile, the tracker roller 40 provided at the side of a vehicle body is constructed in such a manner that an outer surface 41 of the tracker roller rolls on an inner periphery rolling contact surface 32a of the inner peripheral surface 32 of the rubber crawler 30 with the rubber projections 34 formed at the inner side of the rubber crawler 30 being interposed therebetween.

DISCLOSURE OF THE INVENTION

Problems to be solved by the Invention

In the coreless rubber crawler traveling device having the aforementioned structure, a contact area of the inner periphery rolling contact surface 32a on the inner peripheral surface 32 of the rubber elastic body 31 with the tracker roller 40 is constantly made fixed, and the spring characteristics are not sufficient. For this reason, the rubber crawler 30 has such a structure as to directly transmit vibration to a vehicle occupant. The durability of the rubber crawler (for example, occurrence of no rubber crack) becomes better as the contact area increases. However, it can be hardly said that the riding comfortableness of a vehicle is satisfactory. The present invention has been achieved to overcome the disadvantages as described above in consideration of keeping balance between the durability and riding comfortableness.

MEANS FOR SOLVING THE PROBLEMS

The present invention provides a coreless rubber crawler traveling device in which an outer surface of a tracker roller comes into contact with and rolls on an inner periphery rolling contact surface of a rubber elastic body, the device comprising: an endless rubber elastic body; main cord rows embedded in the rubber elastic body along a longitudinal direction of the rubber elastic body; rubber projections formed on an inner peripheral surface of the rubber elastic body at uniform pitches; rubber lugs formed on an outer peripheral surface of the rubber elastic body; and a tracker roller provided at the side of a vehicle body in such a manner as to straddle the rubber projections from right and left sides in a widthwise direction thereof, wherein a contact area of the endless inner periphery rolling contact surface with the outer surface of the tracker roller in a fixed widthwise region is in the range of 30% to 70% with respect to the area of the outer surface of the tracker roller.

In the present invention, not the outer surface of the tracker roller and the inner periphery rolling contact surface of the rubber elastic body are caused to completely come into contact with each other, but rather the contact area therebetween is made smaller and a fixed surface pressure is constantly applied. Therefore, spring elasticity of the rubber elastic body that forms the rubber crawler is exerted to absorb vibration or the like. As a result, excellent riding comfortableness is obtained.

To this end, the contact area of the inner periphery rolling contact surface of the rubber elastic body with the outer surface of the tracker roller is set in the range of 30% to 70%, preferably 30% to 50% with respect to the outer surface area of the tracker roller. The spring characteristics of the rubber elastic body are obtained by just the amount of the contact area lessened. Of course, if the contact area is made too small, the surface pressure becomes high, which is not preferable in terms of the durability. With due consideration for a balance kept between the spring elasticity and the durability, the area ratio is preferably set in the aforementioned range. Incidentally, the inner periphery rolling contact surface is an endless surface formed so as to constantly have a fixed widthwise dimension. Therefore, the fixed spring characteristics are consistently exhibited.

A specific method for reducing the contact area of the inner periphery rolling contact surface of the rubber elastic body with the outer surface of the tracker roller is a method in which stepped portions are formed on the inner peripheral surface of the rubber elastic body facing the (flat) outer surface of the tracker roller, so as to form the upper stage surface and the lower stage surface on the inner peripheral surface, and the upper stage surface (inner periphery rolling contact surface) is caused to come into contact with the rolling surface, thereby reducing the contact area. The aforementioned stepped portions may be formed simply as two flat stepped portions or may be formed with an inclined surface disposed therebetween. Note that the stepped portions may alternatively be formed on the outer surface of the tracker roller with respect to the inner peripheral surface of the rubber elastic body.

Further, the inner peripheral surface of the rubber elastic body is formed into two stepped portions, and the widthwise dimension of the tracker roller is made larger than that of the upper stage surface, thereby leading to a rubber crawler having excellent riding comfortableness and high durability.

Preferably, the stepped portions are formed at outer sides of the inner peripheral surface of the rubber elastic body in the widthwise direction. There are cases in which the stepped portions are formed at both outer sides of the outer surface of the tracker roller in the widthwise direction of the rubber crawler. In the former case, it is particularly preferable that the upper stage surface (inner periphery rolling contact surface) is formed at the central side of the inner peripheral surface of the rubber elastic body and the lower stage surface is formed at the outer side thereof in the widthwise direction of the rubber elastic body. Furthermore, the aforementioned stepped portions preferably may include the lower stage surfaces formed via inclined surfaces.

Here, the reason why the relationship of the contact area ($B_O$) of the inner periphery rolling contact surface with the outer surface ($A_O$) of the tracker roller is set to be in the range of 30% to 70% ($B_O/A_O$) will be further mentioned. The relationship between the area ratio ($B_O/A_O$) and the spring elasticity of the rubber crawler has substantially linear characteristics. If the area ratio ($B_O/A_O$) increases, occurrence of rubber crack and the like is also alleviated, and the durability improves. To the contrary, the spring elasticity becomes poor and the riding comfortableness becomes deteriorated. In terms of the riding comfortableness, it is not preferable that the area ratio ($B_O/A_O$) is too small or too large. According to the results of the ride feeling test, a peak value seems to appear when the area ratio ($B_O/A_O$) is approximately in the range of 30% to 40%. Of course, the evaluation of the rubber crawler would vary depending on whether either of the durability or the riding comfortableness is regarded as important, but it is revealed that the rubber crawlers having the area ratio of 30% to 70%, preferably 30% to 50% are excellent. Thus, the prevent invention has been achieved.

As described above, if the contact area is merely made smaller, the surface pressure when the tracker roller rolls increases, so that the durability of the rubber elastic body may be deteriorated. However, for example, by forming stepped portions on the tracker roller and providing a tracker roller portion having a somewhat small diameter, stones or pebbles are not caused to readily break into the rubber body. Further, with the rubber portion at the side of the upper stage surface (inner periphery rolling contact surface) being deflected, the small-diameter tracker roller portion comes into contact with the lower stage surface (non-contacting stepped portion) with a small surface pressure in an ordinary state. If stones are caught in by the rubber body, they are caught in by the lower stage surface side having a low surface pressure (which surface is normally formed at each of both outer sides of the rubber projections in the widthwise direction). Therefore, the rubber elastic body is not readily damaged. Of course, the tracker roller may not come into contact with the lower stage surface even during a running operation.

EFFECTS OF THE INVENTION

With the traveling device having the aforementioned structure, the contact area of the endless inner periphery rolling contact surface having a fixed width with the outer surface of the tracker roller is made smaller in consideration of the durability of rubber such as rubber crack. As a result, the spring characteristics are constantly maintained and the riding comfortableness is thereby improved.

BEST MODE FOR CARRYING OUT THE INVENTION

Figure 1:
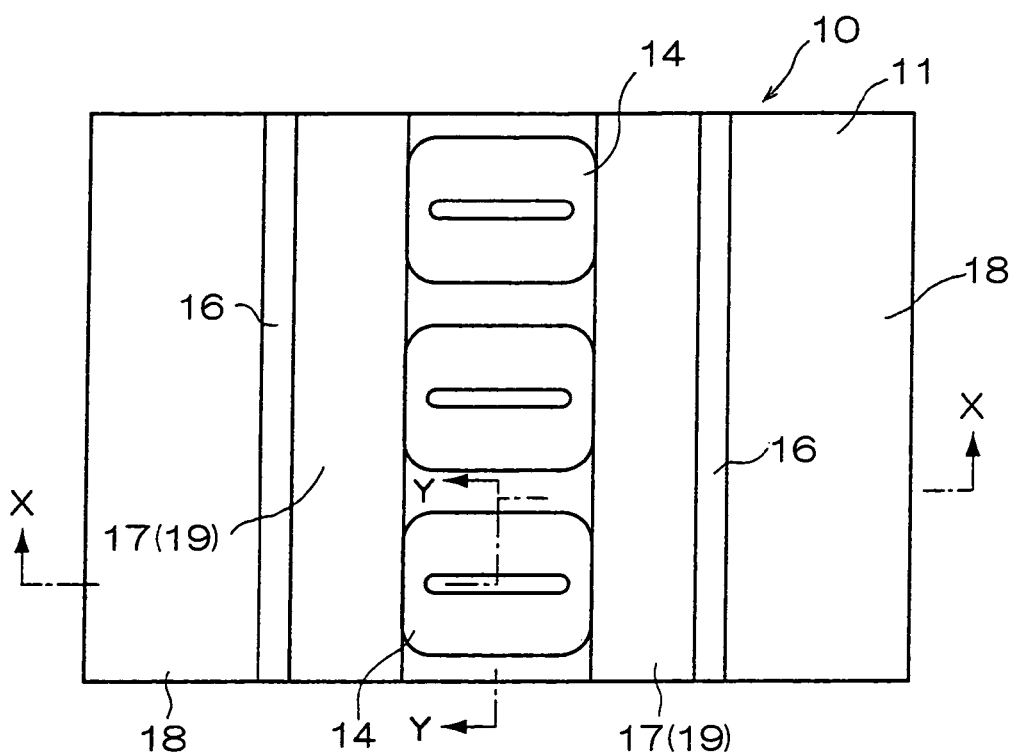
FIG. 1 is a plan view that shows an inner peripheral side of a rubber crawler of the present invention.
Figure 2:
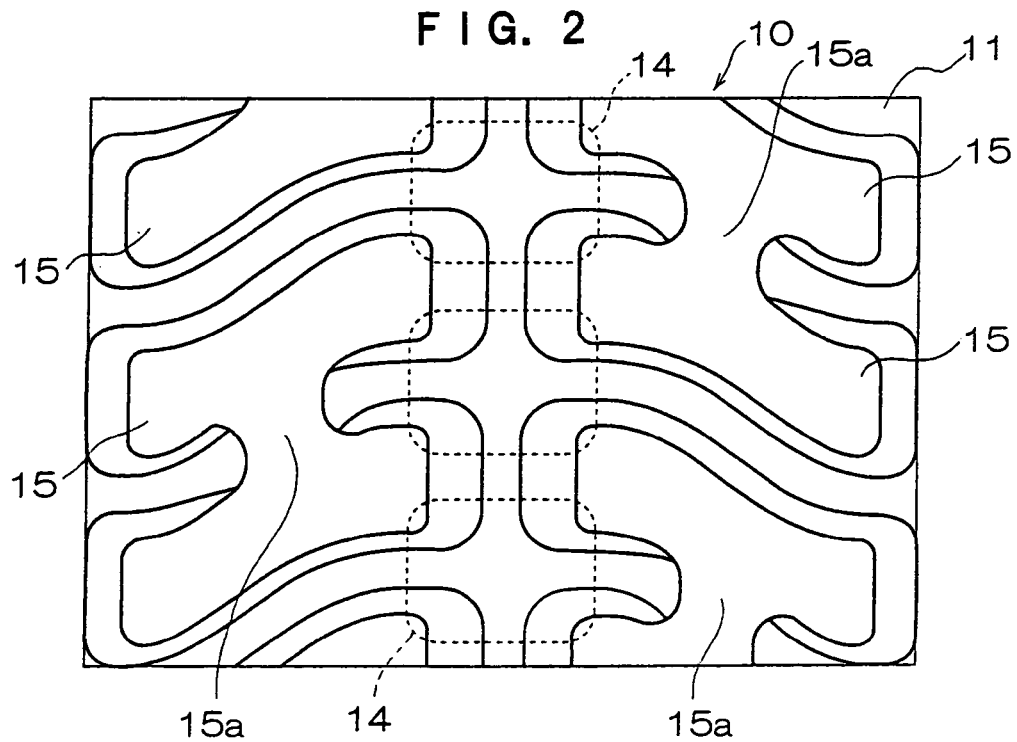
FIG. 2 is a plan view that shows an outer peripheral side of the rubber crawler shown in FIG. 1.
Figure 3:
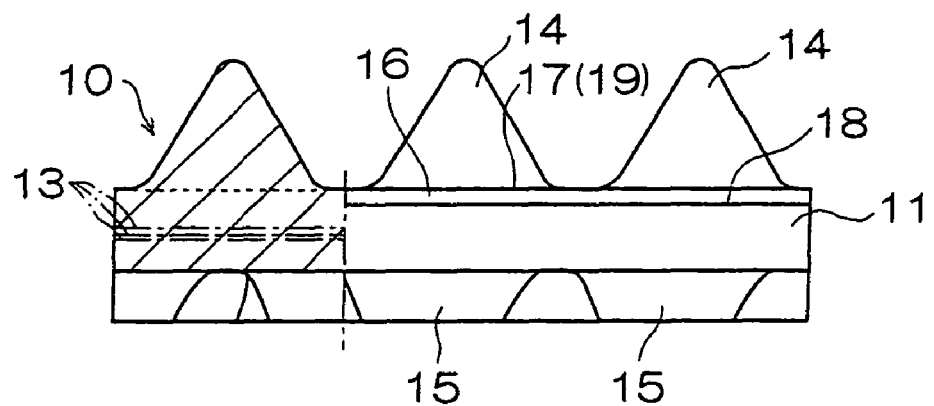
FIG. 3 is a side view of FIG. 1.
Figure 4:
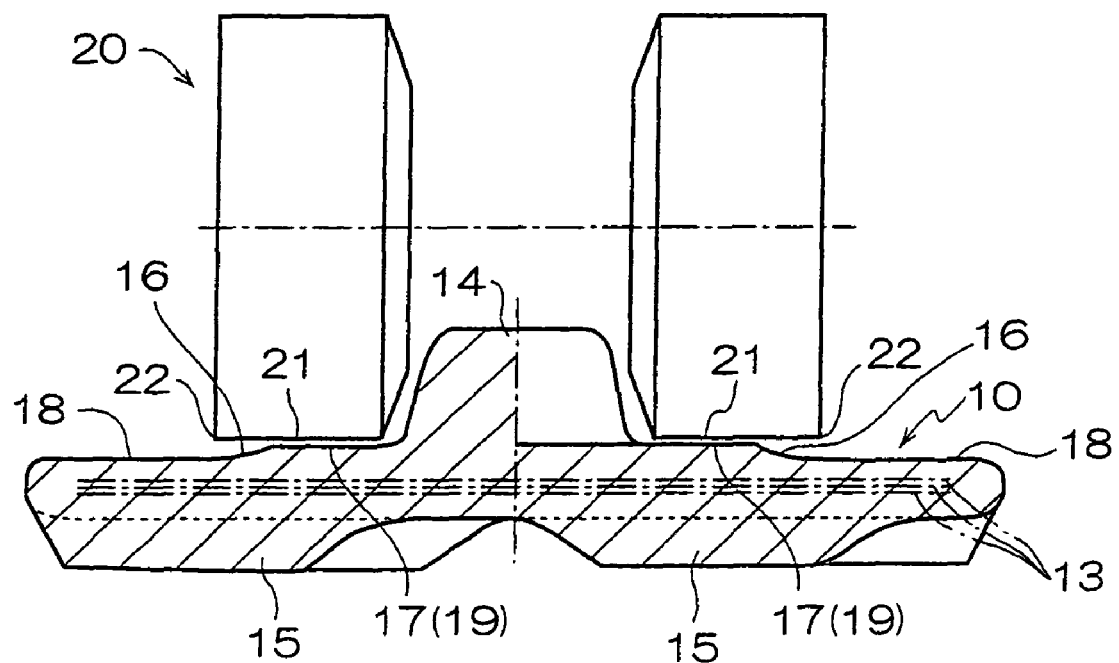
FIG. 4 is a cross sectional view taken along the line X-X in FIG. 1.

Embodiments of the present invention will be hereinafter described in more detail with reference to the attached drawings. FIG. 1 is a plan view showing an inner peripheral side of a rubber crawler of the present invention, FIG. 2 is a plan view showing an outer peripheral side of the rubber crawler, FIG. 3 is a side view of the rubber crawler including a cross section taken along the line Y-Y in FIG. 1, and FIG. 4 is a cross sectional view taken along the line X-X in FIG. 1.

The rubber crawler according to an embodiment of the present invention is denoted by reference numeral 10 in the attached drawings. The rubber crawler 10 has a structure in which no core metal is embedded in a rubber elastic body 11. Steel cord rows 13 serving as main cords are embedded in an endless manner in portions in the range of almost the entire width of the rubber elastic body 11 (in the right and left directions in FIG. 1.) so as to extend in the longitudinal direction of the rubber elastic body 11. Rubber lugs 15 are formed at the outer side of the rubber elastic body 11. These rubber lugs 15 are each formed so as to have a distorted H-shaped configuration in its entirety in plan, and are formed so as to have a staggered arrangement on the right and left sides in the widthwise direction of the rubber elastic body 11. In the present invention, the shape of the rubber lugs 15 is not particularly limited. However, in the present embodiment, each of the rubber lugs 15 is formed so as to have the distorted H-shaped configuration as described above, and a cross-linking portion 15a formed at the center of each rubber lug 15 corresponds to a stepped portion 16 (described later) formed on the inner peripheral side of the rubber elastic body 11. For this reason, the outer peripheral side of the rubber elastic body 11 makes a contribution to reinforcement and sprint characteristics of the stepped portion 16. Further, rubber projections 14 each having a substantially triangular configuration in cross section are formed centrally at the inner peripheral side of the rubber elastic body 11 in the longitudinal direction (in the vertical direction in FIG. 1) so as to be arranged at uniform pitches.

The inner peripheral surface of the rubber elastic body 11 is substantially on the same level with the rubber projections 14 interposed therebetween, and the stepped portions 16 are formed so as to have surfaces sloping down toward both outer sides in the widthwise direction of the rubber elastic body 11. Flat surface portions provided so as to have the rubber lugs 14 interposed therebetween are referred to as upper stage surfaces 17, and portions disposed respectively at outer sides to the right and left in the widthwise direction are referred to as lower stage surfaces 18. In the present embodiment, the ratio of surface area between the upper stage surface 17 and the lower stage surface 18 is approximately 1:2. The upper stage surfaces 17 are each formed so as to have a fixed widthwise dimension.

In the meantime, the tracker roller 20 provided on a vehicle body is formed so that the outer surface 21 thereof is made flat. The tracker roller 20 rolls on the upper stage surfaces 17 (i.e., the inner periphery rolling contact surfaces 19), and both side end portions 22 of the tracker roller 20 in the widthwise direction are respectively located further at the outer side than the upper stage surfaces 17, so as to form a clearance between the lower stage surfaces 18 and the side end portions 22.

In a case in which the inner peripheral surface of the rubber crawler 10 and the outer surface 21 of the tracker roller 20 are brought into full contact with each other in rolling of the tracker roller 20 (in a conventional structure), the inner peripheral surface of the rubber elastic body is brought into the state of being nearly restrained by the tracker roller. For this reason, any spring elasticity is not particularly generated. The lower stage surfaces 18 formed on the inner periphery of the rubber crawler 10 of the present invention are adapted so as not to be restrained by the outer surface 21 of the tracker roller 20. Therefore, the spring elasticity is generated on the lower stage surfaces 18, and the effect of vibration absorption, and the like would be revealed.

In order to achieve the spring characteristics for improvement in the riding comfortableness, the contact area of the inner periphery rolling contact surface 19 (the endless upper stage surface 17 having a fixed widthwise dimension) with the tracker roller is 30 to 70%, preferably 30 to 50% with respect to the outer surface area of the tracker roller. Of course, within the aforementioned range, the durability of rubber can also be satisfied.

In ordinary circumstances, if the ratio of the contact area between the inner peripheral surface of the rubber crawler and the tracker roller is reduced, the surface pressure of the tracker roller with respect to the inner peripheral surface of rubber increases, so that the durability of rubber is apt to be degraded. However, if the widthwise dimension of the tracker roller is relatively made larger than the upper stage surface 17 (inner periphery rolling contact surface 19) as in the present invention, stones or pebbles are not caused to readily break into the rubber portion, and the tracker roller also comes into contact with the lower stage surface at a surface pressure that is smaller than that in a conventional structure, due to the upper stage surface 17 (inner periphery rolling contact surface 19) being deflected. Accordingly, the rubber portion of the upper stage surface is not so much deteriorated. If stones or the like are caught in the rubber portion, they are mainly caught in a rubber portion having a low surface pressure of the tracker roller (lower stage surface). Thus, hollow-out caused by stones or the like scarcely occurs, and the rubber portion of the lower stage surface is not readily damaged.

Next, the effects of the aforementioned rubber crawler traveling device will be demonstrated by means of the traveling device.

(Laboratory Test)

The tracker roller 20 whose outer surface has a widthwise dimension of 124 mm was used and the ratio of the contact area between the outer surface area of the tracker roller and the surface area of the upper stage surface 17 (inner periphery rolling contact surface 19) of the rubber crawler 10 was varied. Under these conditions, the spring constant (KN/mm) was measured. The test example 3 shows that the contact area is 30%. The test example 4 shows that the contact area is 50%. The test example 5 shows that the contact area is 70%. The test example 1 is a conventional rubber crawler structure (contact area: 10%), and the test example 2 shows that the contact area is 20%.

The results of the above-described examples are shown in Table 1 below and are each represented by an index on the basis that the test example 1 is 100.

Under review from long-standing perceptions, it is considered as preferable that the spring constant (index number) is set in the range of 35 to 80. However, it can be seen from the results shown in Table 1 that the rigidity shown in the examples 1 and 2 are too high or too low, and either case is not preferable. However, it can be seen that the examples 3 to 5 show the rubber crawlers set in the preferred range.

(Actual Running Test 1)

The above-described rubber crawler was mounted on each of right and left sides of a test machine having the deadweight of four tons, and a ride feeling test was carried out for evaluation of the riding comfortableness. The results are shown in Table 1 based on a five-step evaluation. The higher the index value, the better the riding comfortableness, and a mark of three or more is excellent.

(Actual Running Test 2)

The endurance test was carried out using the above-described test machine. The results are each evaluated as A (good), B, C or D (poor) and shown in Table 1 below.

When the aforementioned examples were evaluated comprehensively, the example 2 exhibited excellent results in the actual running test 1, but the durability thereof was remarkably deteriorated and was not suitable for use. Further, the example 1 exhibited excellent durability, but the riding comfortableness thereof was poor, thereby making a demand for improvement therein.

Consequentially, the examples 3 through 5 were proved to be well-balanced rubber crawler traveling devices. Particularly, it was revealed that the examples 3 and 4 have produced the best results.

TABLE 1

| | Contact area (%) | Laboratory test (spring constant) | Actual running test 1 (riding comfort performance) | Actual running test 2 (durability) | Overall evaluation |
| --- | --- | --- | --- | --- | --- |
| Example 1 | 100 | 100 | 1 | A | C |
| Example 2 | 20 | 31 or less | 5 | D | D |
| Example 3 | 30 | 39 | 4.5 | B | B |
| Example 4 | 50 | 51 | 4 | B | B |
| Example 5 | 70 | 73 | 3 | B | B |

Figure 5:
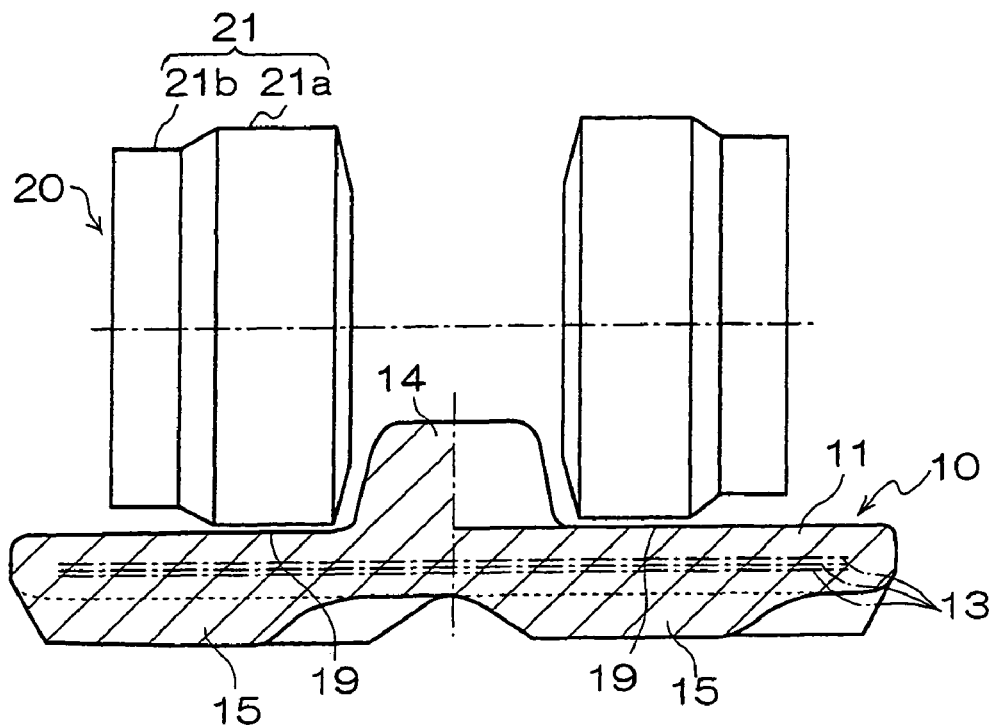
FIG. 5 is a diagram that shows a second embodiment of the present invention.

FIG. 5 shows a second embodiment of the present invention. The inner peripheral surface of the rubber crawler 10 is made flat, but stepped portions are formed on the outer surface 21 of the tracker roller 20. The interior-side outer surface 21a of the tracker roller 20 in the widthwise direction thereof comes into contact with the inner peripheral surface of the rubber elastic body 11 (inner periphery rolling contact surface 19), and the exterior-side outer surface 21b of the tracker roller 20 is not brought into contact therewith. For this reason, the degree at which the rubber elastic body 11 is restrained by the tracker roller 20 becomes small, thereby resulting in that the spring elasticity is generated.

Figure 6:
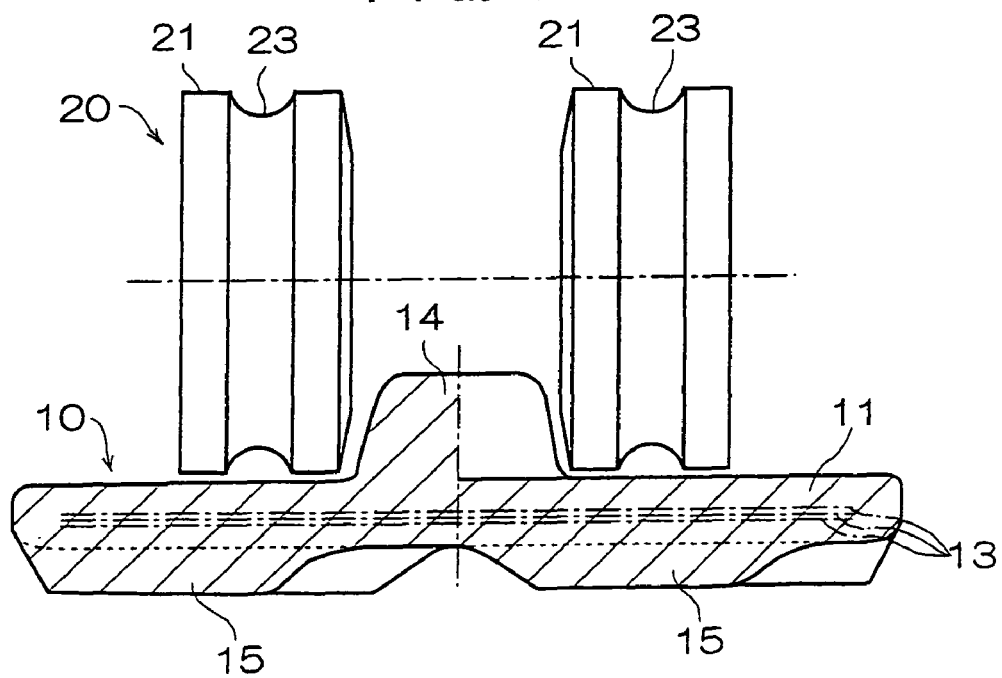
FIG. 6 is a diagram that shows a third embodiment of the present invention.
Figure 7:
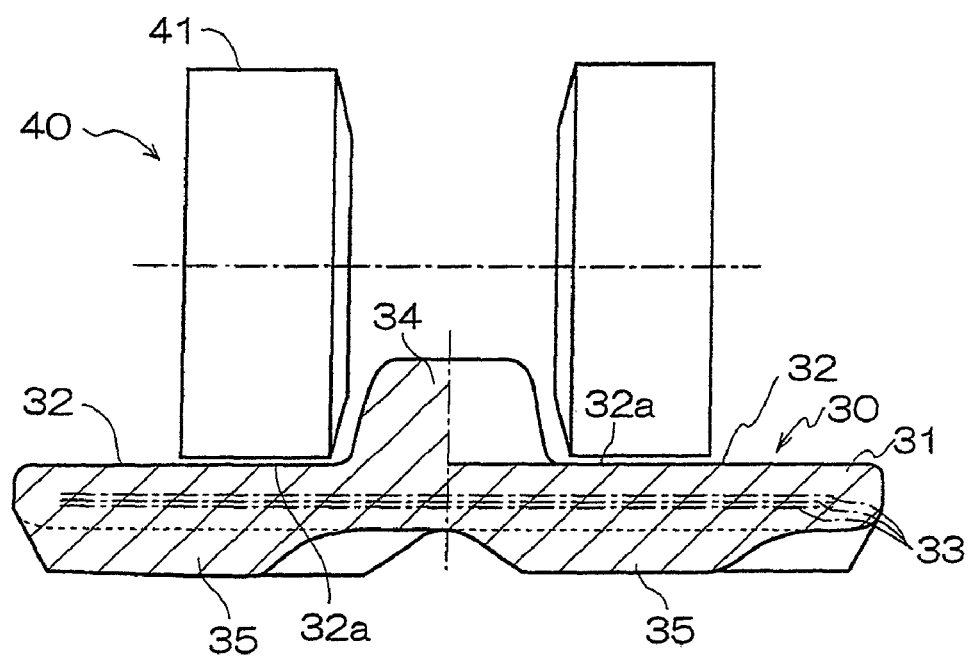
FIG. 7 is a diagram that shows a conventional rubber crawler traveling device.

FIG. 6 shows a third embodiment of the present invention. The inner peripheral surface of the rubber crawler 10 is made flat, but a groove portion 23 is formed at the central portion on the outer surface of each tracker roller 20, so as to partially release the state of restraining the rubber elastic body 11. For this reason, the degree at which the inner periphery rolling contact surface 19 of the rubber elastic body 11 is restrained by the tracker roller 20 becomes smaller, thereby resulting in that the spring elasticity is generated.

INDUSTRIAL APPLICABILITY

As described above, the present invention is achieved to mainly improve the riding comfortableness of a coreless rubber crawler, and thereby can provide a rubber crawler traveling device that can have resistance to high speed running. The present invention also becomes applicable to other wide ranges of rubber crawlers.

What is claimed is:

1. A coreless rubber crawler traveling device, comprising a tracker roller and an endless rubber elastic body, wherein an outer surface of the tracker roller comes into contact with and rolls on an inner periphery rolling contact surface of the rubber elastic body, and wherein the rubber elastic body comprises:

main cord rows embedded in the rubber elastic body along a longitudinal direction of the rubber elastic body;

rubber projections formed on an inner peripheral surface of the rubber elastic body at uniform pitches;

rubber lugs formed on an outer peripheral surface of the rubber elastic body;

wherein the tracker roller is provided at the side of a vehicle body in such a manner as to straddle the rubber projections at right and left sides in a widthwise direction thereof, and wherein the tracker roller has two different diameters at both right and left sides in the widthwise direction of the rubber projections, the two different diameters making up the outer surface of the tracker roller such that a contact area of the endless inner periphery rolling contact surface with the outer surface of the tracker roller in a fixed widthwise region on respective left and right sides of the tracker roller is in the range of 30% to 70% with respect to the area of the outer surface of the tracker roller.

2. The coreless rubber crawler traveling device according to claim 1, wherein a stepped portion is formed on the outer surface of the tracker roller so as to form the at least two different diameters of the tracker roller, thereby causing the contact area to become smaller.

3. A coreless rubber crawler traveling device, comprising a tracker roller and an endless rubber elastic body, wherein an outer surface of the tracker roller comes into contact with and rolls on an inner periphery rolling contact surface of the rubber elastic body, and wherein the rubber elastic body comprises:

main cord rows embedded in the rubber elastic body along a longitudinal direction of the rubber elastic body;

rubber projections formed on an inner peripheral surface of the rubber elastic body at uniform pitches;

rubber lugs formed on an outer peripheral surface of the rubber elastic body, wherein the rubber lugs are each entirely formed so as to have a distorted H-shaped configuration in plan view, the distorted H-shaped configuration including a cross-linking portion formed at a center of each respective lug;

wherein the tracker roller is provided at the side of a vehicle body in such a manner as to straddle the rubber projections at right and left sides in a widthwise direction thereof, and wherein a contact area of the endless inner periphery rolling contact surface with the outer surface of the tracker roller in a fixed widthwise region on respective left and right sides of the tracker roller is in the range of 30% to 70% with respect to the area of the outer surface of the tracker roller, wherein upper stage surfaces are formed at the central portion of the inner peripheral surface of the rubber elastic body, and lower stage surfaces are formed at outer sides of the inner peripheral surface of the rubber elastic body in the widthwise direction, wherein outer sides of the outer surface of the tracker roller extend over the lower stage surfaces, wherein the inner periphery rolling contact surface is provided by forming a stepped portion on the inner peripheral surface of the rubber elastic body, and the cross-linking portion of each of the rubber lugs is disposed so as to correspond to the stepped portion.

4. The coreless rubber crawler traveling device according to claim 3, wherein the contact area of the inner periphery rolling contact surface of the rubber elastic body with the outer surface of the tracker roller is in the range of 30% to 50% with respect to the outer surface area of the tracker roller.

5. The coreless rubber crawler traveling device according to claim 3, wherein the contact area of the inner periphery rolling contact surface with respect to the outer surface of the tracker roller is made smaller.

6. The coreless rubber crawler traveling device according to claim 3, wherein the upper stage surfaces and the lower stage surfaces are provided by forming stepped portions on the inner peripheral surface of the rubber elastic body, and the inner periphery rolling contact surface is constituted by the upper stage surfaces.

7. The coreless rubber crawler traveling device according to claim 3, wherein stepped portions are formed at outer sides of the inner peripheral surface of the rubber elastic body in the widthwise direction thereof between the upper stage surfaces and the lower stage surfaces.

* * * * *